(12) United States Patent
Tambasco

(10) Patent No.: US 11,921,323 B2
(45) Date of Patent: Mar. 5, 2024

(54) BILAYER PHOTONIC 3dB Y-SPLITTER

(71) Applicant: Cisco Technology, Inc., San Jose, CA (US)

(72) Inventor: Jean-Luc Joseph Tambasco, Macungie, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 84 days.

(21) Appl. No.: 17/387,187

(22) Filed: Jul. 28, 2021

(65) Prior Publication Data

US 2023/0034508 A1 Feb. 2, 2023

(51) Int. Cl.
*G02B 6/125* (2006.01)
*G02B 6/12* (2006.01)

(52) U.S. Cl.
CPC ...... *G02B 6/125* (2013.01); *G02B 2006/1215* (2013.01)

(58) Field of Classification Search
None
See application file for complete search history.

(56) References Cited

U.S. PATENT DOCUMENTS

| | | | |
|---|---|---|---|
| 2012/0134628 A1* | 5/2012 | Hoekman | G02B 6/29338 385/50 |
| 2015/0247974 A1* | 9/2015 | Painchaud | G02B 6/12004 385/28 |
| 2017/0363808 A1 | 12/2017 | Mahgerefteh et al. | |
| 2018/0067259 A1* | 3/2018 | Teng | G02B 6/30 |
| 2018/0217334 A1 | 8/2018 | Kato et al. | |
| 2019/0258002 A1 | 8/2019 | Shi et al. | |
| 2020/0218009 A1 | 7/2020 | Preston et al. | |

FOREIGN PATENT DOCUMENTS

EP 3206062 A1 * 8/2017 .......... G02B 6/12002

OTHER PUBLICATIONS

Wesley D. Sacher et al., "Monolithically Integrated Multilayer Silicon Nitride-on-Silicon Waveguide Platforms for 3-D Photonic Circuits and Devices", Proceedings of the IEEE | vol. 106, No. 12, Dec. 2018, 14 pages.
Dominic F. Siriani et al., "Adiabatic guided wave optics—a toolbox of generalized design and optimization methods", vol. 29, No. 3, Feb. 1, 2021, Optics Express, 15 pages.
Zhongjin Lin et al., "Broadband, low-loss silicon photonic Y-junction with an arbitrary power splitting ratio", vol. 27, No. 10 | May 13, 2019 | Optics Express 14338, 6 pages.
Huu Vinh Nguyen et al., "Low-Loss and Broadband Silicon Photonic Y-Junction Using Tapered Rib Waveguides", 2019 International Conference on Optical MEMS and Nanophotonics (OMN), IEEE, Jul. 28-Aug. 1, 2019, 2 pages.
Yi Zhang et al., "A compact and low loss Y-junction for submicron silicon waveguide", Optics Express, vol. 21, Issue 1, Jan. 14, 2013, 7 pages.

* cited by examiner

*Primary Examiner* — Chad H Smith
(74) *Attorney, Agent, or Firm* — Edell, Shapiro & Finnan, LLC

(57) ABSTRACT

A photonic Y-splitter includes a substrate, first optical waveguides disposed in the substrate on a first layer, the first optical waveguides may be flared at a first end and inverse tapered toward a second end and may be substantially mirror images of one another, and a second optical waveguide disposed in the substrate on a second layer, above the first layer, the second optical waveguide being centered over the first optical waveguides and longitudinally arranged between the first end and the second end.

20 Claims, 8 Drawing Sheets

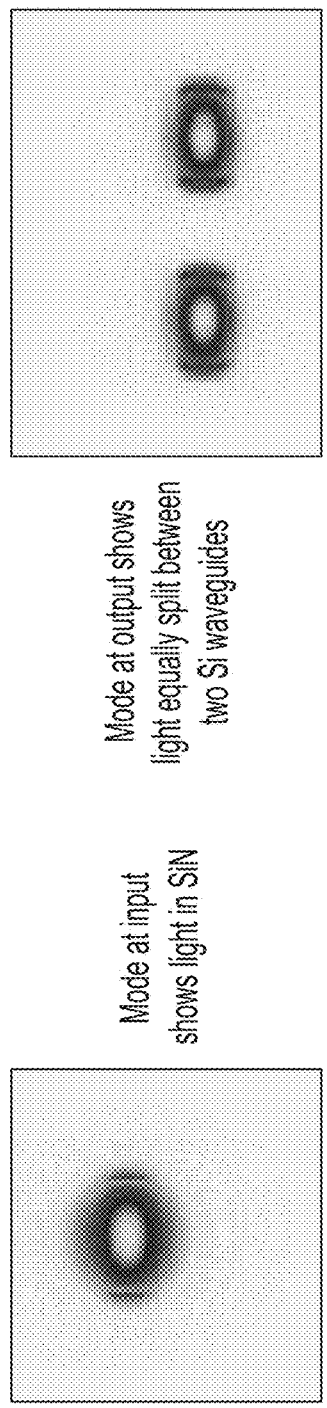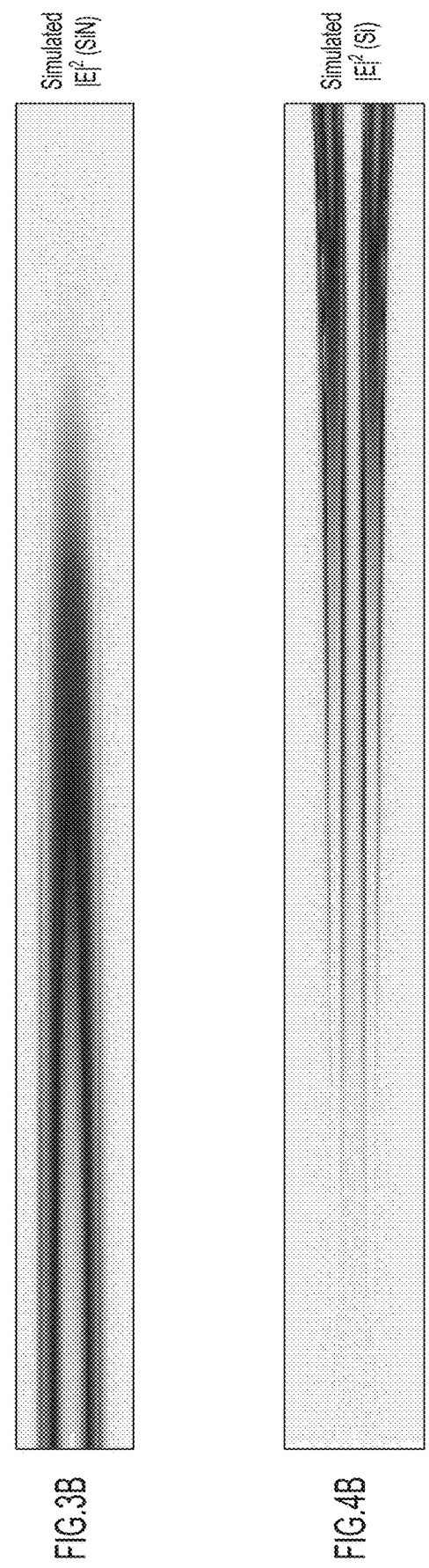

US 11,921,323 B2

BILAYER PHOTONIC 3dB Y-SPLITTER

TECHNICAL FIELD

Embodiments described herein are directed to a photonic Y-splitter.

BACKGROUND

A 3 dB optical Y-splitter is often used on either side of a phase shifter to create a Mach-Zehnder Interferometer (MZI). Optical phase shifters are usually implemented in Si, but some 3 dB splitters are implemented in SiN. This material mismatch means that whenever a 3 dB splitter (SiN) is followed by a phase shifter (Si), a SiN-to-Si transition must be introduced between the two components, thereby increasing footprint, complexity and insertion loss.

BRIEF DESCRIPTION OF THE DRAWINGS

FIG. 3A shows optical power in a y-z plane of a SiN waveguide of the bilayer photonic Y-splitter, and FIG. 3B shows optical power in an x-y plane of the SiN waveguide of the bilayer photonic Y-splitter, according to an example embodiment.

FIG. 4A shows optical power in a y-z plane of Si waveguides of the bilayer photonic Y-splitter, and FIG. 4B shows optical power in an x-y plane of the Si waveguides of the bilayer photonic Y-splitter, according to an example embodiment.

DESCRIPTION OF EXAMPLE EMBODIMENTS

Overview

Figure 1:
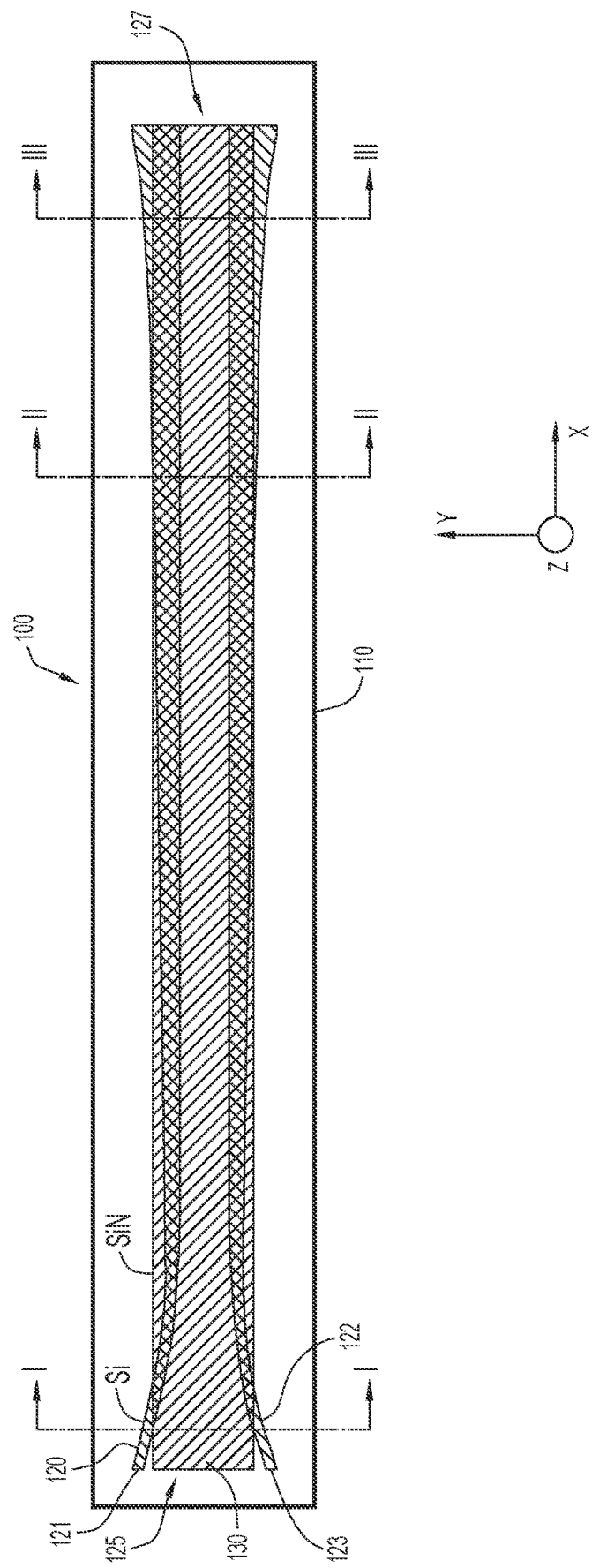
FIG. 1 shows a plan view of a bilayer photonic Y-splitter, according to an example embodiment.

Presented herein is a single Y-splitter device provides 3 dB light splitting and SiN to Si waveguide transition. The device includes a substrate, first (e.g., Si) optical waveguides disposed in the substrate on a first layer, the first optical waveguides may each be flared at a first end and inverse tapered toward a second end and may be substantially mirror images of one another, and a second (e.g., SiN) optical waveguide disposed in the substrate on a second layer, above the first layer, the second optical waveguide being centered over the first optical waveguides and longitudinally arranged between the first end and the second end.

In another embodiment, the Y-splitter device includes a substrate having a first end and a second end, first optical waveguides disposed in the substrate on a first layer between the first end and the second end, and arranged as substantially mirror images of one another, and a second optical waveguide disposed in the substrate on a second layer, above the first layer, the second optical waveguide being centered over the first optical waveguides and longitudinally arranged between the first end and the second end, wherein a gap between the first optical waveguides varies between the first end and the second end.

In still another embodiment, a method is provided. The method includes presenting light at a first end of a SiN optical waveguide, and causing the light to transfer substantially equally to each of two Si optical waveguides that are substantially mirror images of one another and disposed in a layer beneath the SiN optical waveguide.

EXAMPLE EMBODIMENTS

An ongoing goal in the optics field is to make photonic components more compact and with lower loss, while reducing complexity. An optical 3 dB Y-splitter is an important component in many light processing devices, and can thus likewise benefit from further compact design and lower complexity. To minimize its loss and make it more robust to fabrication tolerances, a Y-splitter, historically implemented in silicon (Si), has been re-implemented in silicon nitride $Si_3N_4$ (or, more simply, for purposes of this disclosure "SiN"). This re-implementation is convenient when splitting light from an incoming SiN waveguide to two SiN waveguides. However, when required to split light from an incoming SiN waveguide to two Si waveguides, an additional transition piece is required.

Some photonic devices are implemented in Si over SiN. One such device is an optical phase-shifter, which relies on the thermo-optic or semi-conductor properties of Si. Phase shifters are a basic optical building block used to implement Mach-Zehnder Interferometers (MZIs) or modulators (MZMs), and variable optical attenuators (VOAs). MZIs may be used in a transmitter (Tx) optical chip while VOAs may be used in both a Tx and a receiver (Rx) optical chip. Both MZIs and VOAs are typically implemented using a Y-splitter followed by a phase shifter and a second Y-splitter. When a Y-splitter is implemented in SiN, and the phase shifters are implemented in Si, there is a material mismatch, requiring additional joining pieces.

Transferring light from a SiN waveguide to a Si waveguide (and vice-versa) is accomplished using an interlayer transition. Such a transition has a non-negligible footprint and a non-zero insertion loss, and is used to bridge the connection between SiN and Si components. In some implementations, MZIs and VOAs are fabricated using a Y-splitter (from SiN) followed by an interlayer transition (SiN to Si), phase shifter (Si), interlayer transition (Si to SiN) and another Y-splitter (SiN). In one implementation, the interlayer transitions are 50 um long each, adding 100 um of length to each VOA and MZI as well as insertion loss and complexity. The SiN Y-splitters are also not particularly compact, with a length of about 40 um per Y-splitter.

To, among other things, reduce the overall length of a VOA, MZI or MZM, and to reduce complexity and insertion loss of a Y-splitter, described herein is a structure that combines a SiN Y-splitter and a SiN-to-Si transition into one device. The device accepts light on a SiN waveguide and outputs it equally, i.e., at 3 dB or 50% power, onto two separate Si waveguides. The described Y-splitter has an estimated total length of 20 um-30 um and eliminates the need for discrete interlayer transitions, reducing the length of a VOA, MZI, or MZM by an estimated 120-140 um.

The Y-splitter according to the embodiments described herein features a substantially rectangular SiN waveguide with two underlying Si waveguides having relatively narrow tips that bend in at a first end and an overall inverse taper towards a second end. Those skilled in the art will appreciate that the SiN waveguide need not necessarily be rectangular, but may instead have a tapered shape. The tips of the Si waveguides at the first end have a width of about 100 nm, while ends of the Si waveguides at the second (inverse tapered) end have a width of about 450 nm, consistent with single-mode operation across the O-band. With this structure, light present in the overlying SiN waveguide is drawn into the Si waveguides. Light scattering off the Si tips at the first end is mitigated by bending in the tips.

Because SiN has a significantly lower refractive index than Si, SiN has a larger mode field diameter (MFD), desensitizing the Y-splitter to any overlay mismatch between the Si and SiN layers. Moreover, the inverse tapered shape of the Si waveguides can be optimized to ensure even greater robustness to the design. Such optimization may be performed in accordance with, e.g., the adiabatic design framework described in Dominic F. Siriani and Jean-Luc Tambasco, "Adiabatic guided wave optics—a toolbox of generalized design and optimization methods," Opt. Express 29, 3243-3257 (2021).

Reference is now made to the figures, beginning with FIG. 1, which shows a plan view of a bilayer photonic 3 dB Y-splitter (or simply "Y-splitter") 100, according to an example embodiment. Y-splitter 100 is fabricated within/on a substrate 110 (e.g., SiO$_2$) and includes first optical waveguides 120, 122 that are disposed in substrate 110 on a first layer 250 (in a z-axis direction; see also FIGS. 2A, 2B, and 2C). The first optical waveguides 120, 122 have tips 121, 123 that are flared at a first end 125 of the Y-splitter 100 and are inverse tapered toward a second end 127 of the Y-splitter. In an embodiment, the first optical waveguides 120, 122 are comprised of Si. In another possible embodiment first optical waveguides are comprised of SiN. Y-splitter 100 further includes a second optical waveguide 130 disposed in substrate 110 on a second layer 260, above the first layer. The second optical waveguide 130 has a substantially rectangular, tapered, or other shape, and is centered over the first optical waveguides 120, 122. In an embodiment, the second optical waveguide 130 is comprised of SiN. As shown, the first optical waveguides 120, 122 are substantially mirror images of one another and are arranged as a pair beneath second optical waveguide 130. In an embodiment, the overall longitudinal length (x-axis direction) of Y-splitter 100 from first end 125 to second end 127 is 20-30 um.

Figure 2A:
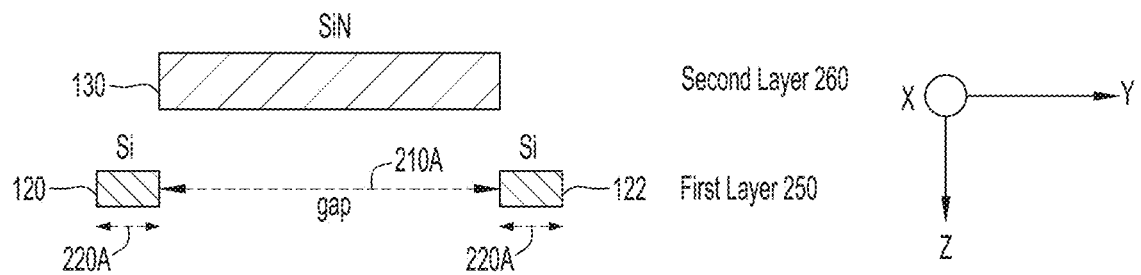
FIGS. 2A, 2B, and 2C show, respectively, cross-sectional views at I-I, II-II, III-III of FIG. 1, according to an example embodiment.
Figure 2B:
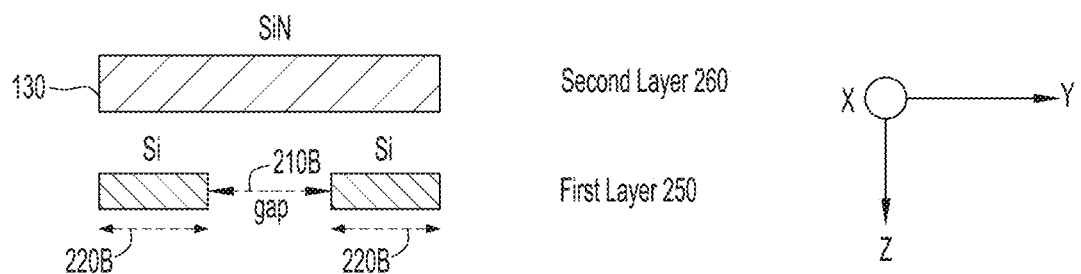
Figure 2C:
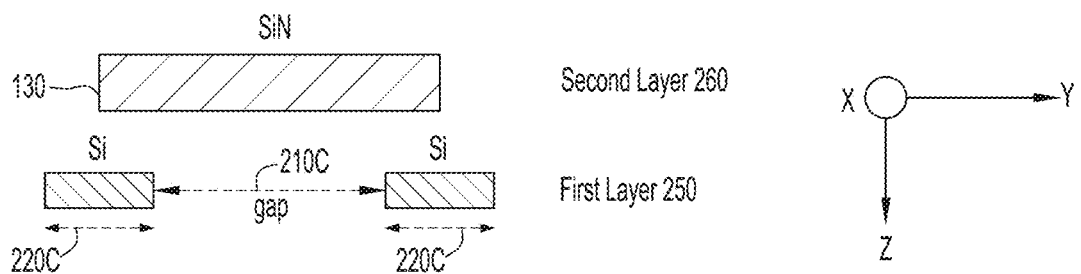

FIGS. 2A, 2B, and 2C show, respectively, cross-sectional views at I-I, II-II, III-III of FIG. 1, according to an example embodiment. FIG. 2A shows a cross-sectional view through I-I of FIG. 1, i.e., near the first end 125. That is, FIG. 2A shows a section of the y-z plane. At that location, first optical waveguides 120, 122, i.e., the pair of first optical waveguides, are bent away from second optical waveguide 130 such that the tips 121, 123 thereof lay entirely outside of the borders of the substantially rectangular shape of second optical waveguide 130. At this position, the width 220A (y-axis direction) of first optical waveguides 120, 122 may be about 100 nm. The height (z-axis direction) of first optical waveguides is about 110 nm, and the gap 210A (y-axis direction) between first optical waveguides 120, 122 is greater than 100 nm. Second optical waveguide 130 has a width of about 1000 nm (1 micron) and a height (z-axis direction) of about 200 nm. The distance between the first layer 250 and the second layer 260 is about 290-300 nm.

FIG. 2B shows a cross-sectional view through II-II of FIG. 1, i.e., between the first end 125 and the second end 127. That is, FIG. 2B shows a section of the y-z plane. At that location, first optical waveguides 120, 122, i.e., the pair of first optical waveguides, are disposed such that they are entirely inside the borders of the substantially rectangular shape of second optical waveguide 130. At this position, the width 220B (y-axis direction) of first optical waveguides 120, 122 are 100 nm-450 nm. The height (z-axis direction) of first optical waveguides 120, 122 is about 110 nm, and the gap 210B (y-axis direction) between first optical waveguides 120, 122 is about greater than 100 nm. Second optical waveguide 130 maintains its width of about 1000 nm (or 1 micron) and a height (z-axis direction) of about 200 nm. The distance between the first layer 250 and the second layer 260 is maintained at about 290-300 nm.

FIG. 2C shows a cross-sectional view through III-III of FIG. 1, i.e., near the second end 127. That is, FIG. 2C shows a section of the y-z plane. At that location, first optical waveguides 120, 122, i.e., the pair of first optical waveguides, are disposed such that they are partially inside and partially outside the borders of the substantially rectangular shape of second optical waveguide 130. At this position, the width 220C (y-axis direction) of first optical waveguides 120, 122 are about 450 nm. The height (z-axis direction) of first optical waveguides 120, 122 is about 110 nm, and the gap 210C (y-axis direction) between first optical waveguides 120, 122 is greater than 100 nm. Second optical waveguide 130 maintains its width of about 1000 nm (or 1 micron) and a height (z-axis direction) of about 200 nm. The distance between the first layer 250 and the second layer 260 is maintained at about 290-300 nm.

FIG. 3A shows optical power in a y-z plane of the second optical waveguide 130 (SiN waveguide) of the bilayer photonic Y-splitter 100, and FIG. 3B shows optical power in an x-y plane of second optical waveguide 130 (the SiN waveguide) of the bilayer photonic Y-splitter 100, according to an example embodiment. $|E|^2$ is the magnitude squared of the electric field (E-field), and as those skilled in the art appreciate, is related to the optical field such that it is possible to show where the light is along the device.

FIG. 4A shows optical power in a y-z plane of the first optical waveguides 120, 122 (Si waveguides) of the bilayer photonic Y-splitter 100, and FIG. 4B shows optical power in an x-y plane of the first optical waveguides 120, 122 (Si waveguides) of the bilayer photonic Y-splitter 100, according to an example embodiment. As can be seen from FIG. 3A, FIG. 3B, FIG. 4A, and FIG. 4B, light input to the SiN waveguide (second optical waveguide 130) is initially fully concentrated in that waveguide without any transition to the lower layer Si waveguides (first optical waveguides 120, 122). As the light travels from the first end 125 to the second end 127 of the Y-splitter 100, the light is transferred substantially equally into the lower layer Si waveguides (first optical waveguides 120, 122) such that at the output (second end 127), all of the light is substantially equally concentrated in the fundamental mode of the pair of Si waveguides (first optical waveguides 120, 122).

Figure 5B:
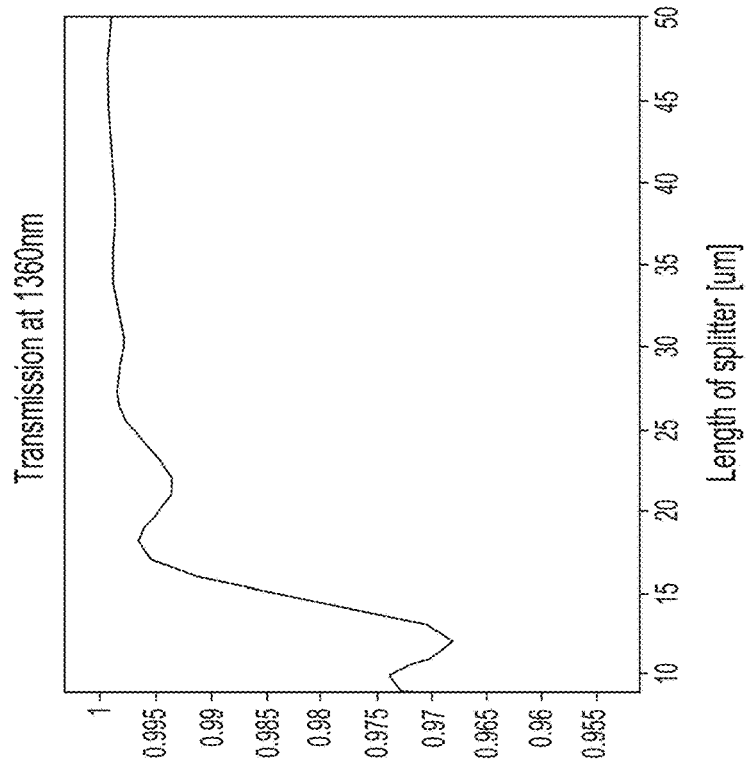
FIGS. 5A and 5B show simulated transmission efficiency of the Y-splitter at 1310 nm and 1360 nm wavelengths, respectively, according to an example embodiment.
Figure 5A:
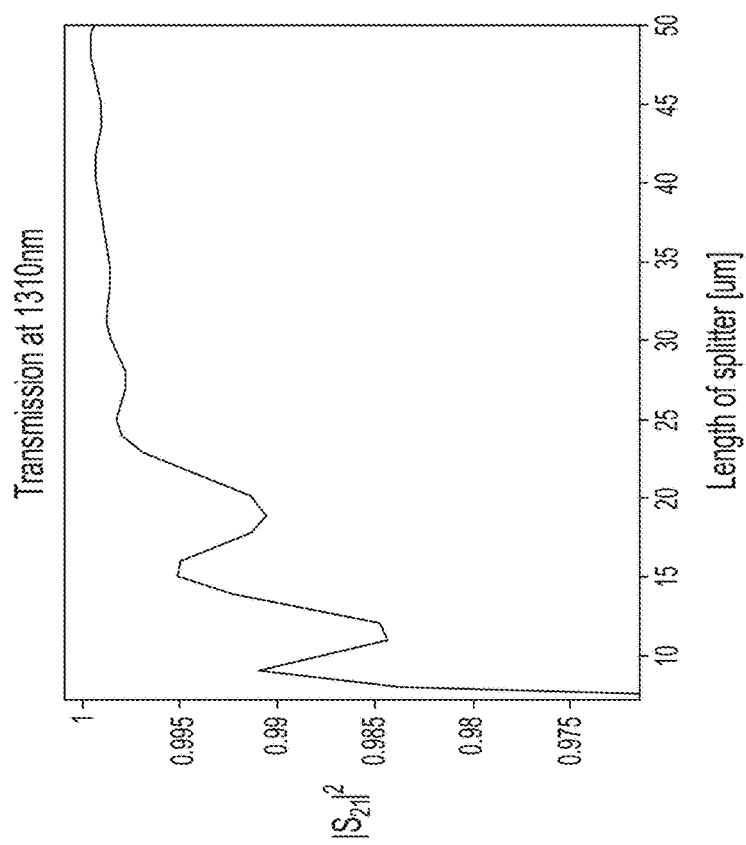

FIGS. 5A and 5B show simulated transmission efficiency of the Y-splitter 100 at 1310 nm and 1360 nm wavelengths (i.e., in the O-band), respectively, according to an example embodiment. As can be seen from these figures, an effective length of the Y-splitter between first end 125 and second end 127 is 20-30 um. The notation $|S_{21}|$ in the figures refers to transmission from an input port to an output port. As can be seen, over 90% efficiency is achieved.

Figure 6:
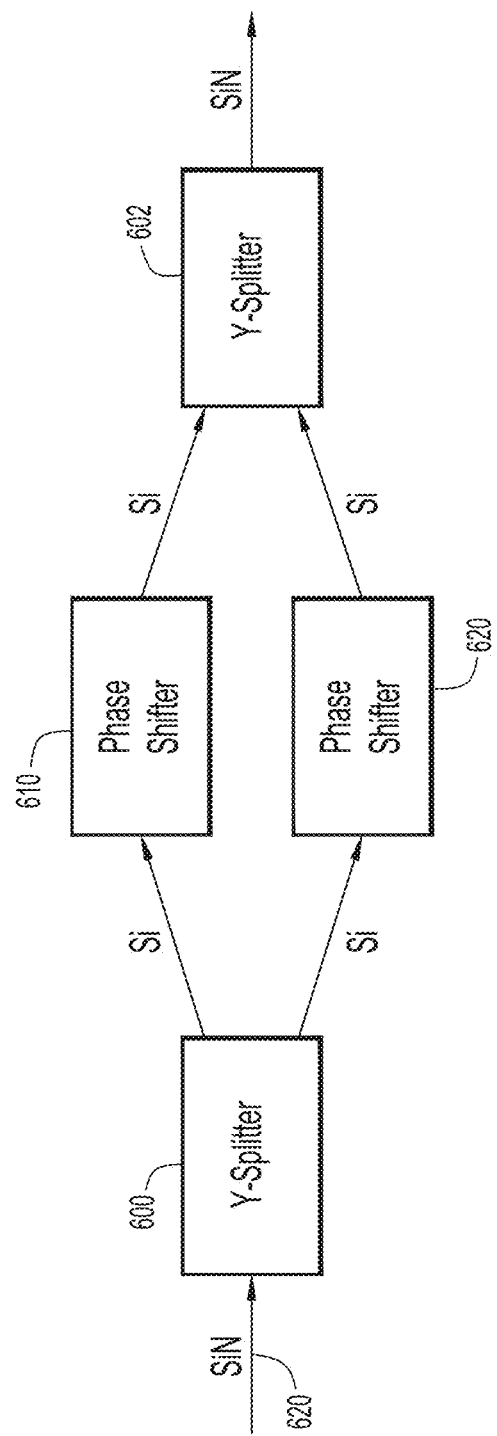
FIG. 6 shows a phase shifter use case for the bilayer photonic Y-splitter, according to an example embodiment.

FIG. 6 shows a phase shifter use case for the bilayer photonic Y-splitter 600, according to an example embodiment. In this case, a Y-splitter 600, consistent with, e.g., the construction of Y-splitter 100, receives light via a SiN waveguide, and outputs two equally powered split light signals over Si waveguides that are in light communication, respectively, with phase shifters 610, 620, which are implemented in Si. Phase shifters 610, 620 output light on Si waveguides, which are in light communication with Y-splitter 602, consistent with, e.g., the construction of Y-splitter 100, but rotated by 180 degrees such that the second end 127 functions as an input, and first end 125 functions as an output.

Figure 7:
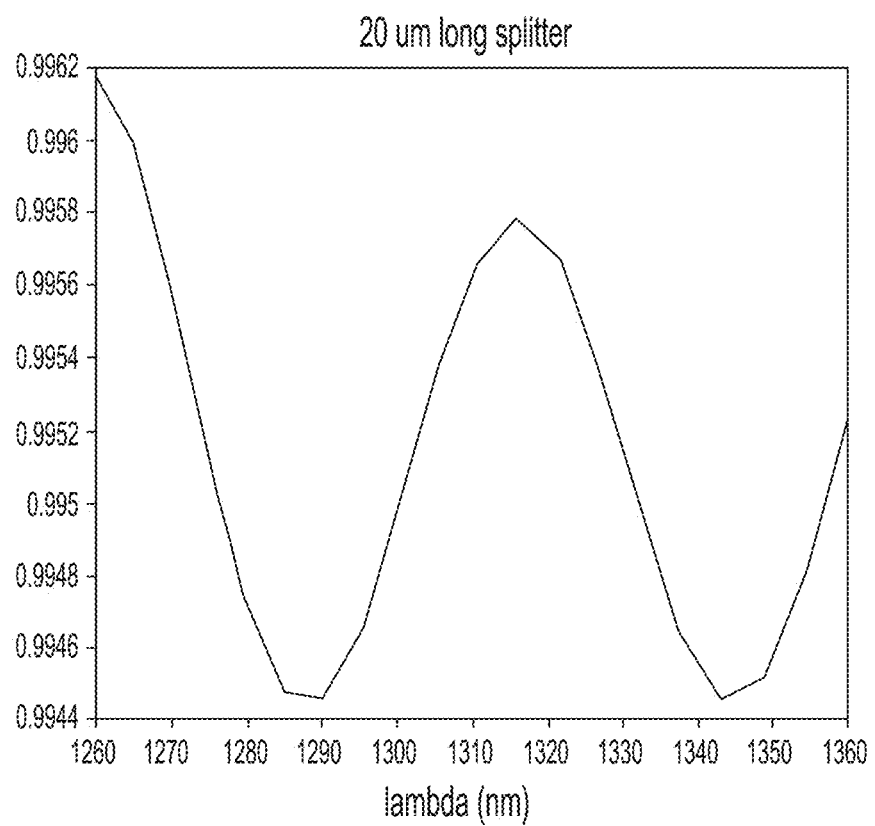
FIG. 7 is a graph showing simulated broadband performance of the bilayer photonic Y-splitter, according to an example embodiment.

FIG. 7 is a graph showing simulated broadband performance of the bilayer photonic Y-splitter 100, according to an example embodiment. As can be seen from the figure, the transmission of a 20 um long Y-splitter 100 according to the embodiments described herein is sufficient across the O-band.

Figure 8:
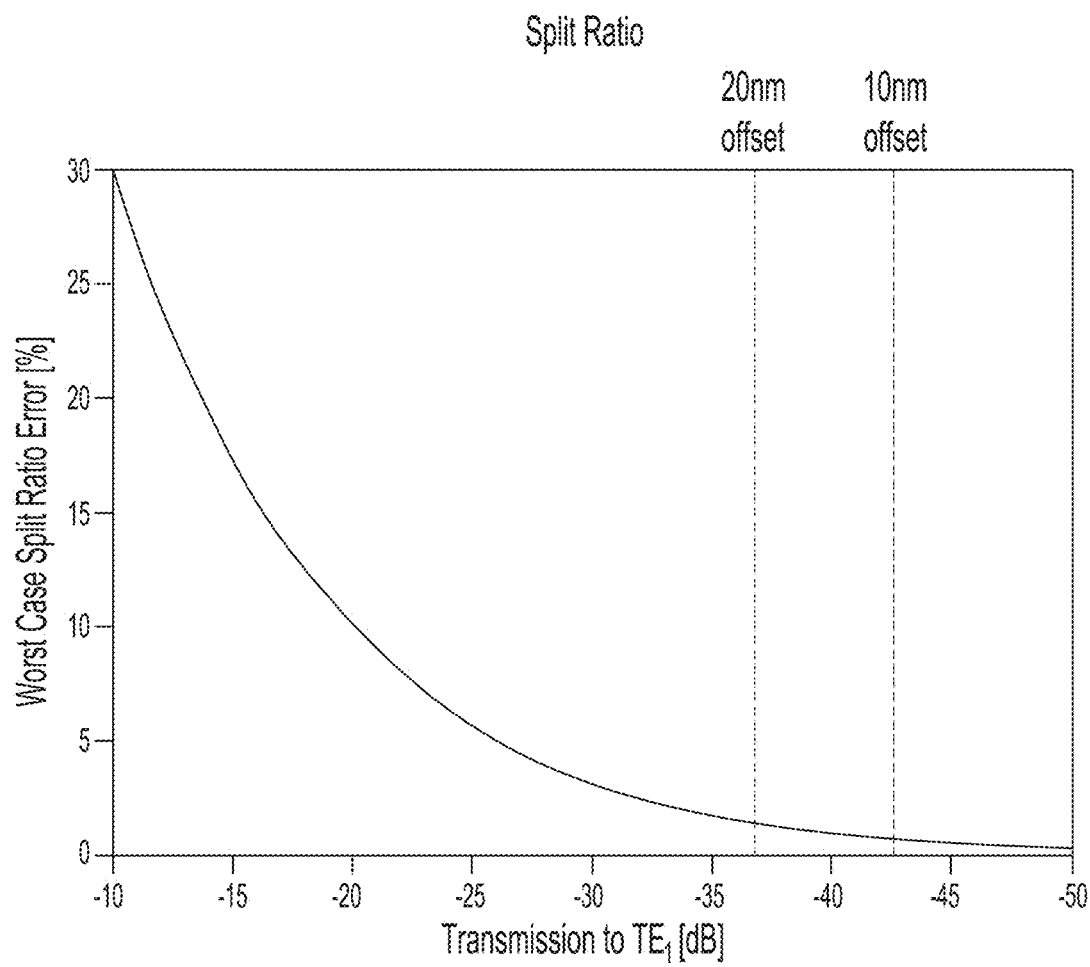
FIG. 8 is a graph showing worst case split ratio error for different mask overlay errors for the bilayer photonic Y-splitter, according to an example embodiment.

FIG. 8 is a graph showing worst case split ratio error for different mask overlay errors for the bilayer photonic Y-splitter, according to an example embodiment. As shown in the figure, according to finite-difference time-domain (FDTD) simulations of mask overlay error, a 20 nm mask overlay error has a maximum split ratio error of ~1.5%, resulting in an expected split ratio of 50%+/−1.5%. A 10 nm mask overlay error has a maximum split ratio of ~0.8%, resulting in an expected split ratio of 50%+/−0.8%.

Figure 9:
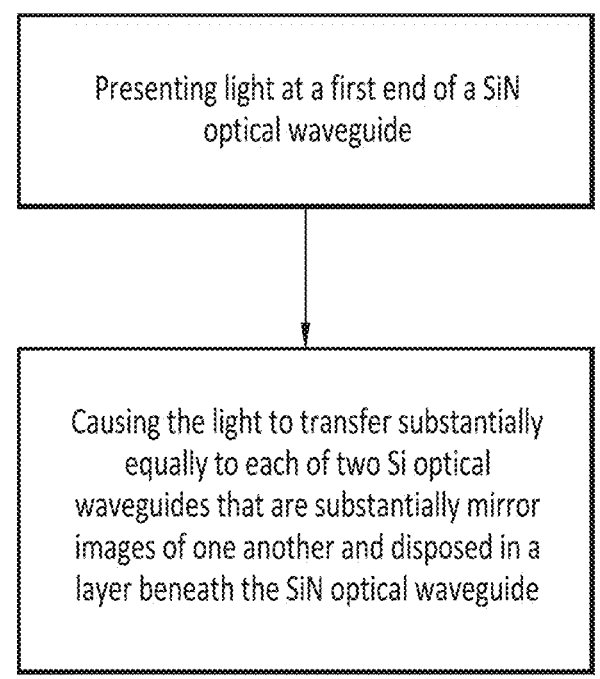
FIG. 9 is a flowchart showing a series of operations for processing light in a bilayer photonic Y-splitter, according to an example embodiment.

FIG. 9 is a flowchart showing a series of operations for processing light in a bilayer photonic Y-splitter, according to an example embodiment. At 902, light is presented at a first end of a SiN optical waveguide, and at 904 the light is transferred substantially equally to each of two Si optical waveguides that are substantially mirror images of one another and disposed in a layer beneath the SiN optical waveguide.

VARIATIONS AND IMPLEMENTATIONS

Embodiments described herein may include or be part of one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a device is provided and includes a substrate, first optical waveguides disposed in the substrate on a first layer, the first optical waveguides being substantially mirror images of one another and being arranged as a pair, and a second optical waveguide disposed in the substrate on a second layer, above the first layer, the second optical waveguide being centered over the first optical waveguides and longitudinally arranged between a first end and a second end of the first optical waveguides.

The first optical waveguides may be flared at the first end and inverse tapered toward the second end.

In an embodiment, the device operates as a 3 dB photonic Y-splitter such that when light is introduced at an end of the second optical waveguide opposite the second end, a half power of the light is output on each of the first optical waveguides at the second end.

The substrate may be comprised of $SiO_2$, the first optical waveguides may be comprised of Si or SiN, and the second optical waveguide may be comprised of SiN.

The first optical waveguides may have portions that lay entirely outside of borders of the second optical waveguide, partially inside and partially outside the borders of the second optical waveguide, and entirely inside the borders of the second optical waveguide.

In an embodiment, a total longitudinal length of device is 20 um-30 um, and the device operates in the O-band above a 90% efficiency.

The device may also be combined with a phase shifter.

In another embodiment, a device includes a substrate having a first end and a second end, first optical waveguides disposed in the substrate on a first layer between the first end and the second end, and a second optical waveguide disposed in the substrate on a second layer, above the first layer, the second optical waveguide being centered over the first optical waveguides and longitudinally arranged between the first end and the second end, wherein a gap between the first optical waveguides varies between the first end and the second end.

The first optical waveguides may have portions that lay entirely outside of borders of the second optical waveguide, partially inside and partially outside the borders of the second optical waveguide, and entirely inside the borders of the second optical waveguide The first optical waveguides may be flared at the first end and inverse tapered towards the second end.

In an embodiment, the device may operate as a 3 dB photonic Y-splitter such that when light is introduced at the second optical waveguide opposite the second end, a half power of the light is output on each of the first optical waveguides at the second end.

The first optical waveguides may be comprised of Si, the second optical waveguide may be comprised of SiN, and a total longitudinal length of the device is 20 um-30 um.

In still another embodiment, a method includes presenting light at a first end of a SiN optical waveguide, and causing the light to transfer substantially equally to each of two Si optical waveguides that are substantially mirror images of one another and disposed in a layer beneath the SiN optical waveguide.

In an embodiment, the two Si optical waveguides have first ends and second ends, the first ends of the two Si optical waveguides are flared, and the two Si optical waveguides are inverse tapered towards the second ends.

The method may further include supplying light output from the two Si optical waveguides to a phase shifter implemented in Si.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A device comprising:
    a substrate;
    first optical waveguides disposed in the substrate on a first layer, the first optical waveguides being substantially mirror images of one another and being arranged as a pair; and
    a second optical waveguide disposed in the substrate on a second layer, above the first layer, the second optical waveguide having a substantially rectangular shape with a long axis and a short axis, and being laterally centered over the first optical waveguides and longitudinally arranged between a first end and a second end of the first optical waveguides with the long axis parallel to a line that bisects the first optical waveguides and extends between the first end and the second end of the first optical waveguides, wherein, in cross-section, at least a portion of a longitudinal edge of the second optical waveguide is aligned between longitudinal edges of a given one of the first optical waveguides.

2. The device of claim 1, wherein the first optical waveguides are flared at the first end and inverse tapered toward the second end.

3. The device of claim 1, wherein the device operates as a RIB photonic Y-splitter such that when light is introduced at an end of the second optical waveguide opposite the second end, a half power of the light is output on each of the first optical waveguides at the second end.

4. The device of claim 1, wherein the substrate is comprised of $SiO_2$.

5. The device of claim 1, wherein the first optical waveguides are comprised of Si.

6. The device of claim 1, wherein the second optical waveguide is comprised of SiN.

7. The device of claim 1, wherein the first optical waveguides have portions that lay entirely outside of borders of the second optical waveguide, partially inside and partially outside the borders of the second optical waveguide, and entirely inside the borders of the second optical waveguide.

8. The device of claim 1, wherein a total longitudinal length of the device is 20 um-30 um.

9. The device of claim 1, wherein the device operates in O-band wavelengths above a 90% efficiency.

10. The device of claim 1, in combination with a phase shifter.

11. A device comprising:
a substrate having a first end and a second end;
first optical waveguides disposed in the substrate on a first layer between the first end and the second end; and
a second optical waveguide disposed in the substrate on a second layer, above the first layer, the second optical waveguide having a substantially rectangular shape with a long axis and a short axis, and being laterally centered over the first optical waveguides and longitudinally arranged between the first end and the second end with the long axis parallel to a line that bisects the first optical waveguides and extends between the first end and the second end,
wherein a gap between the first optical waveguides varies between the first end and the second end, and
wherein, in cross-section, at least a portion of a longitudinal edge of the second optical waveguide is aligned between longitudinal edges of a given one of the first optical waveguides.

12. The device of claim 11, wherein the first optical waveguides have portions that lay entirely outside of borders of the second optical waveguide, partially inside and partially outside the borders of the second optical waveguide, and entirely inside the borders of the second optical-waveguide.

13. The device of claim 11, wherein the first optical waveguides are flared at the first end and inverse tapered towards the second end.

14. The device of claim 11, wherein the device operates as a 3 dB photonic Y-splitter such that when light is introduced at the second optical waveguide opposite the second end, a half power of the light is output on each of the first optical-waveguides at the second end.

15. The device of claim 11, wherein the first optical-waveguides are comprised of Si.

16. The device of claim 11, wherein the second optical waveguide is comprised of SiN.

17. The device of claim 11, wherein a total longitudinal length of the device is 20 um-30 um.

18. A method comprising:
presenting light at a first end of a SiN optical waveguide; and
causing the light to transfer substantially equally to each of two Si optical waveguides that are substantially mirror images of one another and disposed in a layer beneath the SiN optical-waveguide, wherein, in cross-section, at least a portion of a longitudinal edge of the SiN optical waveguide is aligned between longitudinal edges of a given one of the two Si optical waveguides.

19. The method of claim 18, wherein the two Si optical waveguides have first ends and second ends, the first ends of the two Si optical waveguides are flared, and the two Si optical waveguides are inverse tapered towards the second ends.

20. The method of claim 18, further comprising supplying light output from the two Si optical waveguides to a phase shifter implemented in Si.

* * * * *

UNITED STATES PATENT AND TRADEMARK OFFICE
CERTIFICATE OF CORRECTION

| | |
|---|---|
| PATENT NO. | : 11,921,323 B2 |
| APPLICATION NO. | : 17/387187 |
| DATED | : March 5, 2024 |
| INVENTOR(S) | : Jean-Luc Joseph Tambasco |

Page 1 of 1

It is certified that error appears in the above-identified patent and that said Letters Patent is hereby corrected as shown below:

In the Claims

Claim 3, Column 9, Line 15, please replace "a RIB photonic Y-splitter such that when light is introduced" with --a 3dB photonic Y-splitter such that when light is introduced--

Claim 12, Column 10, Lines 11-12, please replace "second optical-waveguide" with --second optical waveguide--

Claim 18, Column 10, Line 35, please replace "beneath the SiN optical-waveguide," with --beneath the SiN optical waveguide,--

Signed and Sealed this
Ninth Day of July, 2024

Katherine Kelly Vidal
*Director of the United States Patent and Trademark Office*